(12) United States Patent  
Causton et al.

(10) Patent No.: US 7,378,180 B2
(45) Date of Patent: May 27, 2008

(54) AIR ELECTRODE BATTERIES

(75) Inventors: Brian Edward Causton, Reading (GB); Frank Davis, Caldervale (GB); Neville Keith Lacey, Reading (GB); Larry Liaobo Yu, Reading (GB)

(73) Assignee: The Gillette Company, Boston, MA (US)

( * ) Notice: Subject to any disclaimer, the term of this patent is extended or adjusted under 35 U.S.C. 154(b) by 580 days.

(21) Appl. No.: 10/655,449

(22) Filed: Sep. 4, 2003

(65) Prior Publication Data
US 2004/0048145 A1 Mar. 11, 2004

(30) Foreign Application Priority Data
Sep. 6, 2002 (GB) .................. 0220798.9

(51) Int. Cl.
*H01M 2/12* (2006.01)
(52) U.S. Cl. .................. 429/54; 429/72; 429/53; 429/82
(58) Field of Classification Search ........... 429/71, 429/72, 82, 83, 85, 86, 129, 163, 164, 347
See application file for complete search history.

(56) References Cited
U.S. PATENT DOCUMENTS 4,052,534 A * 10/1977 Devitt ................. 429/86
4,180,624 A * 12/1979 Winsel ................. 429/54
4,439,500 A    3/1984 Gibbard et al.
5,299,877 A    4/1994 Birden
5,486,429 A    1/1996 Thibault
5,842,618 A * 12/1998 Julemont et al. ........... 222/490
6,284,400 B1 * 9/2001 Adey et al. ............. 429/27
6,350,537 B1 * 2/2002 Pedicni ............... 429/27

FOREIGN PATENT DOCUMENTS
WO    WO 00/36696    6/2000

OTHER PUBLICATIONS

Handbook of Batteries, David Linden, 2nd edition, McGraw-Hill, pp. 12.2, 12.3, and 12.8.*
The definition of natural rubber [online], Hawley's Chemical Dictionary [retrieved on Jan. 30, 2007] <http://www.knovel.com/knovel2/Toc.jsp?BookID=704>.*
Linden, Handbook of Batteries, pp. 13.1-13.5, McGraw-Hill, Inc., 1995.*

* cited by examiner

*Primary Examiner*—Susy Tsang-Foster
*Assistant Examiner*—Cynthia Lee
(74) *Attorney, Agent, or Firm*—Fish & Richardson P.C.

(57) ABSTRACT

A battery includes an air electrode and an air access passageway that is closed by a non-liquid valve actuable by differential pressure to provide an opening therein to admit air to the battery.

38 Claims, 7 Drawing Sheets

FIG. 1A
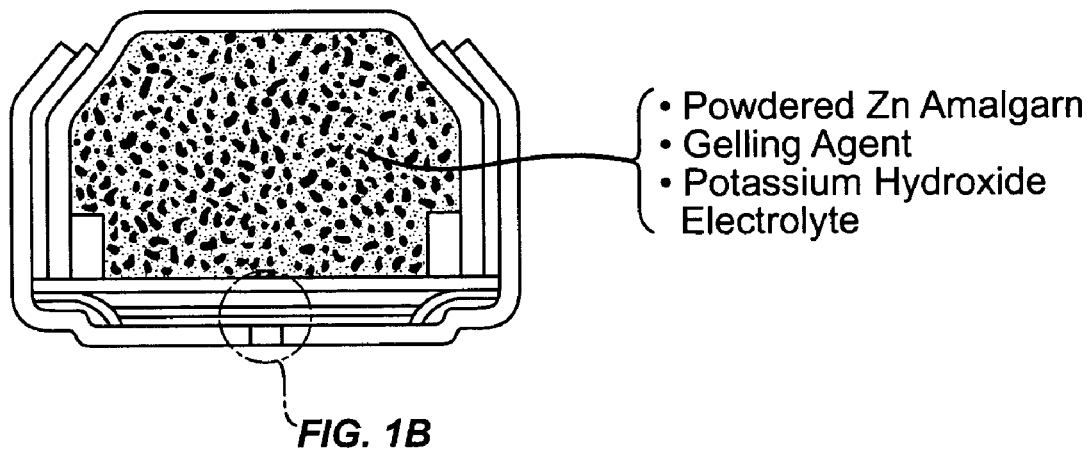
- Powdered Zn Amalgam
- Gelling Agent
- Potassium Hydroxide Electrolyte
FIG. 1B
FIG. 1B
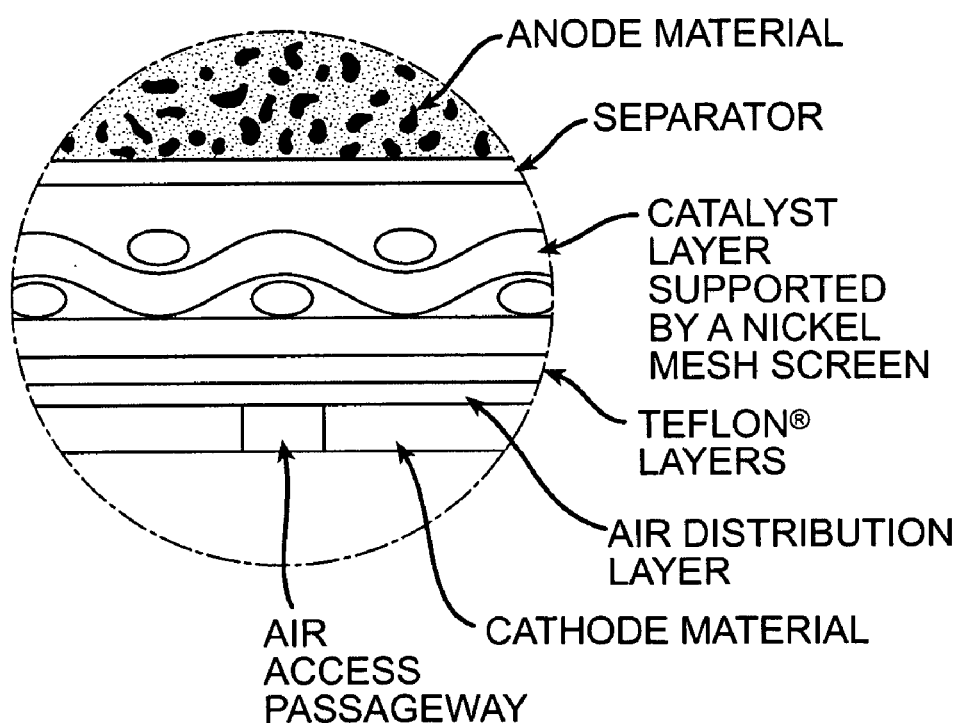

AIR ELECTRODE BATTERIES

CLAIM OF PRIORITY

This application claims priority under 35 U.S.C. § 119 to United Kingdom Patent Application Ser. No. 0220798.9, filed on Sep. 6, 2002, the entire contents of which are hereby incorporated by reference.

FIELD OF THE INVENTION

This invention relates to air electrode batteries, that is batteries in which air is admitted to an electrode, normally the cathode, either for normal discharge operation of the battery or, at low or nil discharge rates, to restore or recharge the electrode.

BACKGROUND

Primary zinc/air batteries are known. They deliver the highest energy density of any commercially available battery system and at a low operating cost. They are usually in the form of small button cells and, as such, are widely used, for example, in hearing aids and in children's toys. They are not rechargeable and at the end of their life they are thrown away.

A typical zinc/air button cell is shown in the self-explanatory FIG. 1A and FIG. 1B of the accompanying drawings which show an axial section of the cell with an enlarged view (FIG. 1B) of part of the cathode. Button cells are normally fabricated with a temporary closure (not shown) externally over the air access passageway or hole, the closure being removed to activate the battery when it is first to be used. The battery functions by admission of air through the air access passageway, the oxygen in the air being consumed by reaction in the cell. The oxygen-depleted air diffuses out of the cell through the air access passageway, and fresh air is admitted.

Whilst it is an attractive feature of zinc/air batteries to be able to supply reactant oxygen simply by provision of an air access passageway in the cathode, this arrangement also has some disadvantages. In particular, it allows transmission of water vapour into and out of the cell and it allows ingress of carbon dioxide. Transmission of water vapour affects the concentration of the potassium hydroxide electrolyte in the anode and the precipitation conditions of the zinc oxide in the anode, cathode and separator, the loss or gain of water over a period depending on the humidity of the environment in which the battery is being used. Carbon dioxide admitted can react with the electrolyte to reduce its activity. In practice, it is believed that the useful life of a zinc/air button cell is determined by gain or (in many cases more usually) loss of water rather than by exhaustion of the electrical capacity.

These problems are addressed to some extent in current zinc/air cells by controlling the water flux by using hydrophobic polytetrafluoroethylene (PTFE) both in the cathode and as a membrane on the cathode, and by careful selection of the size and number of the air access holes. However, neither of these techniques has proved very satisfactory. It has further been suggested to use complex mechanical and/or electromechanical valves to control the admission of air but these are expensive in construction and in operational energy requirement.

Another approach has been to provide in the supporting structure for the battery a tiny electric fan preferably with long air diffusion tubes as set forth in AER WO 94/25991.

The fan is actuated when current is drawn from the battery, in order to blow in replacement air. However, about 10% of the electrical energy output of the cell is needed to drive the system and it occupies about 10% of the cell volume. For these reasons and because of cost, it is not an attractive solution to the problem of controlling water flux.

US patent specification no. 4439500 to Gibbard et al. describes zinc/air cells provided with a gas switch to control the water flux into and out of the cell. The switch comprises a liquid disposed in and normally closing an air passageway for the cell, the liquid and passageway being such that when there is an adequate pressure differential across the passageway, the liquid is temporarily forced aside and out of the passageway by the differential air pressure to open the passageway to allow air to flow therethrough into and out of the cell. When the pressure differential subsequently reduces, the liquid returns into the passageway to once more occlude it. Whilst this device is simple, it has a number of disadvantages not least of which is the fact that if the battery is subjected to shock or vibration, for example, the liquid can be permanently displaced from the passageway so that the gas switch is then effectively destroyed. The liquid can also be absorbed by the surrounding structure or contaminate the active materials of the battery.

Another method of controlling air access (and hence water flux) to zinc/air batteries, which is simple and economic, reliable and extremely effective, needs to be developed.

Other air electrode batteries are known, for example air recovery (also known as air assisted or air restored) batteries. An air recovery battery is a battery that uses air to recharge its cathode during periods of low or no discharge. One type of air recovery battery employs zinc powder as the anode, manganese dioxide ($MnO_2$) as the cathode, and an aqueous solution of potassium hydroxide as the electrolyte. At the anode, zinc is oxidized to zincate and at the cathode, $MnO_2$ is reduced to manganese oxyhydrate.

When the cell is not in use or when the rate of discharge is sufficiently slow, atmospheric oxygen enters the cell and reacts with the cathode. Manganese oxyhydrate is oxidized to form $MnO_2$. During high rates of discharge, air recovery batteries operate like conventional alkaline cells by reducing "fresh" (unreduced) $MnO_2$. During low rates of discharge and periods of rest with no current flow, the "consumed" (reduced) $MnO_2$ is restored or recharged by atmospheric oxygen to the fresh state. In air recovery batteries, the cathode is normally housed within a container (for example a can) and at least one air access passageway is provided in the container to allow air to enter and contact the cathode. The provision of an air access passageway in air recovery batteries can give rise to the same or similar problems as arise in zinc/air batteries as described above, and a method of controlling the air access in such batteries, which method is simple and economic, reliable and effective, needs to be developed.

SUMMARY OF THE INVENTION

In one aspect, the invention provides a battery having an air electrode wherein at least one air access passageway is closed by a non-liquid valve actuable by differential pressure to provide at least one opening therein to admit air to the battery.

In one preferred arrangement, said at least one air access passageway is arranged to admit air to an air space in the battery, and the said valve is actuable in response to a fall in pressure in said air space relative to air pressure externally of the battery, to open said passageway to admit air to said air space.

In accordance with a highly preferred feature of the invention, the valve comprises at least one thin resilient membrane normally closing said passageway but being deformable by differential pressure to provide said at least one opening. In one such arrangement, each said membrane has a discontinuity therein, said discontinuity being normally closed but openable by differential pressure. The discontinuity is preferably a cut made in said membrane without removal of membrane material. Ideally, the discontinuity is rectilinear and may have a length of from 3 mm to 7 mm. The discontinuity preferably has a length of 6 mm.

In a preferred arrangement, the discontinuity is located centrally in a portion of membrane extending unsupported in said at least one air access passageway. The unsupported membrane portion is ideally of an elliptical shape. It is also preferable for opposed ends of said discontinuity to be each spaced from the edge of said unsupported membrane portion. The opposed ends of said discontinuity may each be spaced from the edge of said unsupported membrane portion by a distance of between 0.5 mm and 1.0 mm.

It is also a preferred feature of the invention that said discontinuity is of such a length as to allow abutting portions of membrane defining said discontinuity to move apart from one another in response to the application of a pressure differential across said unsupported membrane portion of no more than 2 mbar. Ideally, said pressure differential is no more than 0.5 mbar.

The invention will hereafter be described principally with reference to slit membrane valves and flap membrane valves but it will be understood that other (non-liquid) differential pressure valves could potentially be used. In the context of the following description, a distinction is made between slit and flap membrane valves. A slit membrane valve is to be regarded as comprising a discontinuity in a membrane which is openable in use to allow a passage of air therethrough. The discontinuity may take many forms, but is ideally provided as a straight cut made in the membrane without removal of membrane material. Unless indicated otherwise, reference hereinafter to a slit is to a discontinuity in this form. In contrast, a flap membrane valve is to be regarded as comprising a portion of membrane which forms a flap for completely or partially occluding an air passageway. The flap may be deflected in use so as to allow passage of air therepast.

When a current is drawn from a battery of the invention such as a zinc/air battery, equipped with a membrane slit or flap valve of the invention, oxygen within the cell is consumed. As the oxygen is consumed, the air pressure inside the cell falls. Initially, the slit/flap valve may remain closed but when enough oxygen has been consumed to lower the pressure inside the cell sufficiently below outside ambient pressure, the membrane is deformed and the slit/flap valve opens to admit further air as required. When the air pressure is nearly equalised across the membrane, the slit/flap valve closes to prevent further air passage past the slit/flap, thereby also preventing water transmission through the valve.

Similarly, when an air recovery battery is not in use or when the rate of discharge is low, oxygen in the air adjacent the cathode is consumed by reaction to re-oxidise the cathode. As the oxygen is consumed, the air pressure in the battery falls sufficiently below the outside ambient pressure to deform the membrane and open the slit/flap valve. Further air is then admitted as required. When the air pressure is nearly equalised across the membrane, the slit/flap valve closes to prevent further air passage past the slit/flap, thereby also preventing water transmission through the valve.

Particularly in the case of the zinc/air battery where a constant demand for oxygen may arise as current is drawn, it is preferable for the valve arrangement to ensure that the valve, once opened, remains in a steady open configuration with the differential pressure across the valve remaining constant. In these circumstances, oxygen is admitted through the valve at the rate at which it is consumed. Thus, rather than fluctuating between the open and closed configurations when current is drawn, the valve ideally remains in a steady-state (equilibrium) open configuration. In the case of a zinc/air battery, the valve only closes when current ceases to be drawn from the battery. It will be understood that the valve must be tailored to a particular cell design and applied current. If the steady-state occurs with a valve opening too small to allow sufficient air flow to support the applied current, then the battery will choke. Battery efficiency will also be adversely affected if the valve opening becomes too large when differential pressure is applied.

In a further preferred arrangement, each said passageway is covered by a said membrane. Ideally, said membrane is mounted with respect to a casing of the battery, said casing comprising said at least one air access passageway. Each said membrane may be mounted directly on said casing normally to close at least one air access passageway. The or each said membrane is ideally mounted on a plate member located with respect to said battery casing. It is further preferable for the or each membrane to be elastomeric and ideally to exhibit substantially zero permanent deformation on recovery from up to 10% deformation.

Furthermore, it is a preferred feature of the invention for the or each said membrane to be from 10 to 500 µm thick. The or each said membrane is preferably from 10 to 200 µm thick and, more preferably, is approximately 100 µm thick.

It is also preferable for the or each said membrane to be of a material having a Young's modulus of not greater than 28 MPa. Ideally, the membrane material has a Young's modulus from 1.6 to 1.8 MPa. Alternatively, the membrane material may have a Young's modulus of not greater than 2 kPa and preferably of approximately 1.6 kPa. It is further preferable for the membrane to be of a material having a resilience of not greater than 50 MPa. Ideally, the membrane material has a resilience not greater than 2 MPa and, ideally, has a resilience of approximately 1.1 MPa.

It is a highly preferred feature of the invention that the or each said membrane is of a material having both a Young's modulus from 1.6 to 1.8 MPa and a resilience of approximately 1.1 MPa. It is also preferable for the or each said membrane to have been made by calendaring. The or each said membrane is preferably of natural rubber, neoprene, nitrile rubber, polybutadiene, a copolymer of butadiene, polyisoprene, a butyl rubber or a silicone elastomer. More preferably, the or each said membrane is of natural rubber or addition-cured vinyl siloxane.

The aforementioned battery preferably comprises a cathode accessible to the air admitted to the battery. The battery may be a zinc/air battery or an air recovery battery. The battery may also be a mobile telephone battery.

The invention also includes an elastomeric membrane of thickness from 10 to 500 µm having substantially zero permanent deformation when deformed by up to 10%, having a Young's modulus of up to about 10 MPa and a resilience of at least about 0.5 MPa, said membrane having at least one slit therein which slit is normally closed but which can be opened when a pressure difference is applied across the membrane. The Young's modulus of the membrane is preferably approximately 1.6 kPa.

In the cells of the invention, the air space adjacent the cathode is preferably sealed (other than at the valve) so as to maximise the pressure drop created on removal of the oxygen to open the slit valve and admit more air.

The nature of the elastomeric membrane is important if its function is to be optimal. In particular, the elastomers need to be highly elastic so that the membranes return substantially to their original dimensions after opening of the valve and thereafter going shut i.e. the membranes should preferably exhibit a low permanent deformation by which we mean zero or negligible permanent deformation for up to 10% deformation. The deformation, if any, should not be such to affect the functionality of the valve.

Furthermore, the membranes should be resilient so that the associated slits or flaps defined therein will close quickly when there is little or no difference in gas pressure across the membrane. The preferred resilience needed is a return, after deformation, to zero deformation at zero load. Thus, the resilience can be expressed as the energy required to deform a material to its proportional limit (but no further) so that, when the load is removed, the material recovers to its original conformation. One measure of resilience is the area under the stress/strain curve. Measured in this way, a resilience as low as about 0.06 MPa (100 μm thick nitrile rubber) is too low but a resilience of about 0.5 MPa and greater is generally acceptable. The resilience of 100 μm natural rubber is about 1.1 MPa. In general, filled or chemically extended elastomers containing plasticiser or another additive, will not be suitable as membrane materials for use in the invention, since they will not have the desired resilience.

As will be clear to those skilled in the art, the slit/flap membranes of the invention function as differential pressure activated valves when used to cover air access passageways to zinc/air batteries in accordance with the present invention. For this purpose, the slit/flap valve remains closed until there is a differential pressure across the membrane sufficient to deform the membrane and open the valve. Where the membrane defines a slit, the differential pressure is sufficient to deflect the membrane at the slit so as to cause an opening to form between the opposed cut faces of the membrane as they move apart. Further, when the differential pressure across the membrane is then reduced, the deflection of the membrane at the slit is reduced so that the opening closes as the opposed cut faces return into face-to-face relationship corresponding to closure of the valve.

The membrane must be supported so that, in the absence of adequate differential pressure across the membrane, the valve remains in a closed configuration. It will be appreciated that the maximum distance between the support and a slit, i.e. the maximum distance of unsupported membrane to the slit, will depend on the mechanical properties of the membrane in question. Thus, in relatively thin membranes, the maximum unsupported distance will be less than in thicker membranes of the same material. Similarly, when membranes of relatively stiff material are used, the maximum unsupported membrane distance will be greater than when less stiff materials are used. The density of the membrane material can also be an important factor: the greater the density, the lower the maximum unsupported membrane distance. In general we use unsupported membrane distances of from about 0.9 mm to 3.5 mm.

It will also be appreciated that the minimum pressure differential (across a supported slit membrane) which will cause opening of the slit will vary in dependence on a number of factors including the unsupported membrane distance, the thickness of the membrane, the Young's modulus, the slit length, the density etc. In any particular case, the minimum valve-opening pressure differential will be chosen with reference to the requirements of the battery, and the various membrane factors chosen to provide the desired valve-opening pressure differential.

In general, it is preferred that the length of slit should not be more than 6 or 7 mm and should be provided in membrane material extending across either circular or elliptical holes. The diameter of circular holes and the major axis of elliptical holes should be approximately 8 mm. As a result, each end of the slit may be spaced from the perimeter of the hole by between 0.5 mm and 1.0 mm. Holes having a elliptical shape can be preferable since these can be more closely arranged to one another allowing a greater flow rate of air into a battery for a given battery size. However, it will be understood that the minor axis of an elliptical hole is shorter than the diameter of a corresponding circular hole framing the same length of slit. Accordingly, the unsupported width (ie the perpendicular distance from the slit to the hole perimeter) of membrane material will be less for an elliptical hole than for a circular hole. As a result, the pressure differential required to operate an elliptical valve will be greater than that required to operate a circular valve even though the membrane materials and slit lengths are identical in each case.

For a slit having a length of 6 mm and an elliptical hole having a major axis of 8 mm, experimentation indicates that a latex material of 100 μm thickness, a Young's modulus of 1.6 MPa and a resilience of 1.1 MPa opens to permit a flow of air under a pressure differential of 1 mbar or more. For latex of 100 μm thickness, it has been shown through experimentation that undesirable sagging of membrane material occurs when the slit length is greater than 6 mm. This can have the undesirable effect of allowing air to flow into the battery and permitting water vapour to flow out of the battery through the slit. With a slit length of between 3 and 6 mm, it has been shown that an effective valve may be provided using membrane thicknesses of between 50 μm and 200 μm. However, a 50 μm membrane can be readily damaged and very likely to sag regardless of slit length and unsupported membrane width. Silicone or nitrile may also be used as a membrane material. However, nitrile with a Young's modulus of 8.2 MPa and a resilience of 0.06 MPa is stiffer than latex and results in a slit which is more difficult to open (ie requires a greater pressure differential) and, due to the low resilience of nitrile, is slow to close.

Experimentation with slit valve arrangement has confirmed that the condition of a slit valve when resting is a function of membrane material stiffness, unsupported width and slit length. The stiffness of membrane material is also a function of thickness. Experimentation indicates that, for a given membrane material, the length of slit that can be provided without generating a sagging in membrane material is approximately proportional to the thickness of the membrane material. However, it can be said that the greater the membrane thickness, the less efficiently the valve operates.

There are many suitable elastomeric materials from which the membranes can be made, but we prefer to use elastomers such as natural rubber, neoprene, nitrile rubber, polybutadiene, copolymers of butadiene, polyisoprene, butyl rubbers and silicone elastomers. Mechanically, the most preferred material is an addition-cured vinyl siloxane, but this is sensitive to potassium hydroxide in the electrolyte. Natural rubber is generally more preferable, e.g. the natural rubber as used in a dental dam.

The membranes are prepared in any suitable way. We prefer to use calendering.

Slits are preferably cut in the membranes using a milling machine with blades, for example, and without loss of material from either face of the cut. A membrane may have more than one slit in it, but it is preferred that slits should not intersect since this increases any sag effect and a thicker membrane may then be required to overcome the problem.

The membrane slit and flap valves of the present invention can be used generally in air electrode batteries such as zinc/air batteries or air recovery batteries to control the ingress/egress of gases. It is an important feature of the present invention that the valves open only on demand, i.e. when there is a pressure differential across the membrane between the ambient pressure and the cell internal pressure. In this way, air is admitted to drive a zinc/air cell for example only when, in response to electrical demand on the cell, the oxygen therein is depleted sufficiently to cause a pressure drop in the cell, causing the slit/flap valve to open. Thus, when there is no electrical demand on a zinc/air cell over a period, air is not admitted to the cell. This is in contrast to known arrangements such as the use of removable seal tabs over the air holes where, once air is admitted to the cell by peeling off the air tab, there is no way of terminating the air supply with the result that the battery self-discharges even when there is no electrical demand.

In contrast, in air recovery batteries, the demand for oxygen only arises when the cell is not in use (or there is a low discharge rate) since, under these circumstances, the depleted cathode material will react with oxygen in the air to restore the cathode material to its original oxidised state. As the reaction proceeds, the oxygen in the cell is depleted and the slit/flap valve opens to admit more air. When the reaction is complete, or the cell is on full discharge, the slit/flap valve will be closed.

The membranes of the invention most preferably are mounted in the air electrode batteries so that air can only be admitted to the battery past the slit or flap valve in the membrane. We prefer to mount an untensioned membrane adhesively on an apertured support plate. The membrane slit(s) or flap(s) are formed so as to be exposed in the plate aperture(s). The membrane is thus supported in the regions of the slits or flaps as described in more detail herein.

Among the known zinc/air cells or batteries to which the invention can be applied (possibly with some minor modification of the cell or battery) are prismatic, button, coin, cylindrical and bobbin cells. In addition, we have devised a zinc/air mobile telephone battery (herein called a "telecom battery") in accordance with a feature of the present invention. Telecom batteries are designed to provide the high rate discharges of modern mobile telephones. Thus, they are capable of high current pulsing over long periods of time. There are various GSM standards such as, for example, GSM 900 which requires pulses of 1.4A/0.55 msec to 0.135A/4.05 msec, pulsed for 2 min every 15 min and providing at least 1.0V/cell. It will be apparent therefore that the invention is not limited to button cells, but has application in a wide variety of cell geometries (e.g. AA and AAA cylinder cells).

DESCRIPTION OF THE DRAWINGS

In order that the invention may be more fully understood, further reference is now made to the accompanying drawings.

FIG. 1A is an axial sectional view of a typical known zinc/air button cell; FIG. 1B is an enlarged view of the cathode of FIG. 1A.

DETAILED DESCRIPTION

Figure 1C:
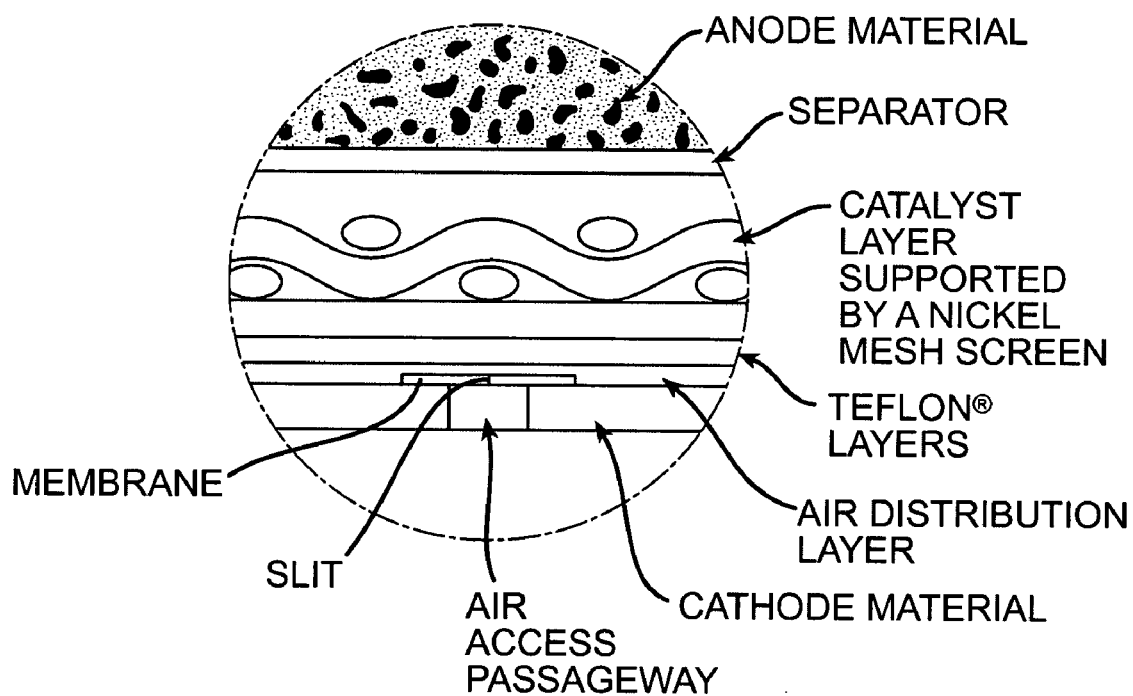
FIG. 1C is an enlarged view of the cathode of FIG. 1A but modified to show a membrane slit valve of the invention incorporated in the cell.

Referring to the drawings, FIG. 1C shows the same enlarged view of the cathode of the cell of FIG. 1B, but with a thin resilient membrane adhesively mounted on the cathode and overlying the air access passageway. In the region of the passageway, the membrane has a discontinuity therein in the form of a straight cut so that a slit membrane forms a valve for control of the flow of gases through the air access passageway. The membrane is made from latex having a thickness of 100 μm. Other materials, such as silicone or nitrile, may be used. The membrane is adhered to the cathode about the air access passageway by means of Specseal 105 or other suitable adhesive. The length of the slit is 3 mm. Slit lengths up to 7 mm may be used, however each end of the slit should be spaced from supported membrane material (ie material adhered to the cathode) by unsupported membrane material (ie membrane material located in the passageway and not adhered to the cathode). Thus, the conventional zinc/air button cell of FIG. 1A and FIG. 1B is modified as in FIG. 1C to be in accordance with the present invention.

Figure 2:
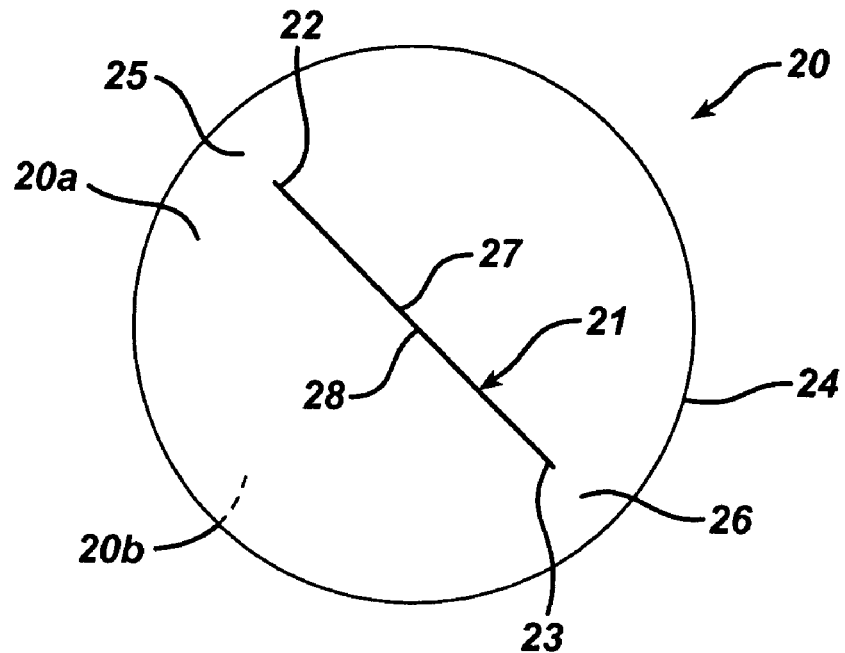
FIG. 2 illustrates a membrane slit valve of the invention in the closed position.
Figure 2A:
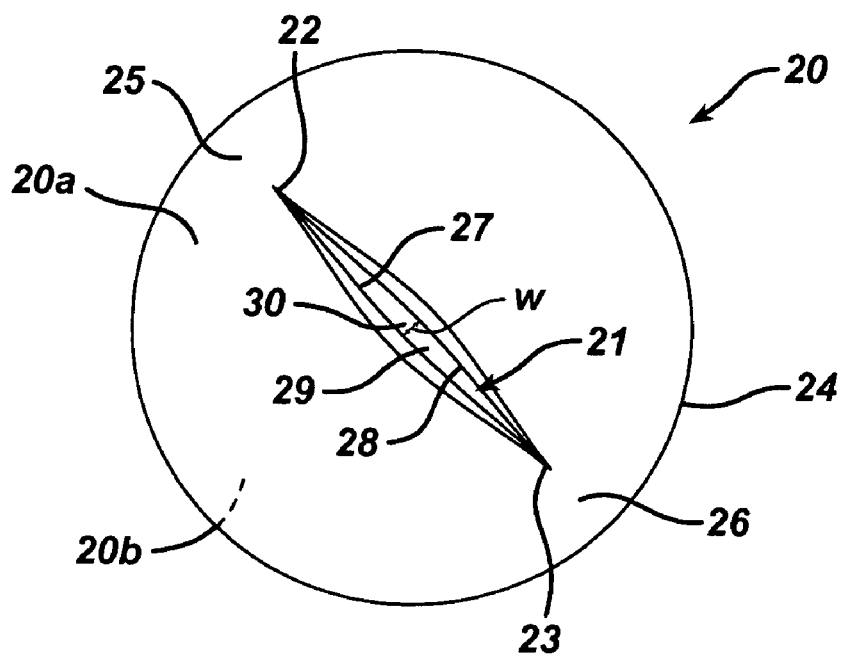
FIG. 2A illustrates a membrane slit valve of the invention in the open position.

Referring to FIGS. 2 and 2A, in which like numerals indicate like parts, there is shown in plan view of a flat circular membrane disc 20 having a front surface 20a and a rear surface (now shown) 20b. The disc has a diametrical slit 21 therein. Slit 21 has opposed ends 22, 23 which are each spaced from the edge 24 of disc 20 by respective margins 25, 26. The slit 21 has been cut in disc 20 with substantially no loss of membrane material so that the opposed faces (27, 28) of the membrane at the slit lie in face-to-face contact in FIG. 2. The slit 21 is thus closed. In accordance with the invention, FIG. 2 illustrates the condition of the slit membrane valve when the fluid pressure on front surface 20a is substantially the same as the fluid pressure on rear surface 20b.

FIG. 2A shows the same disc 20 as in FIG. 2 except that the fluid pressure on the rear surface 20b exceeds that on front surface 20a by an amount sufficient to open the slit 21. As can be seen in FIG. 2A, the opposed faces 27, 28 of the membrane at the slit 21 are no longer in face-to-face contact. Instead, the membrane has deflected outwardly of its plane, at the slit region, to cause the faces 27, 28 to move outwardly and apart so forming an opening 29 therebetween. The width "w" of the opening is greatest at the centre region 30 of the disc 20 and narrows down to nil at or towards the respective ends 22, 23 of the slit. The size "w" of opening at the centre region of the disc will depend on the fluid pressure differential across the membrane, and on the mechanical properties of the membrane and how it is supported (no support is shown in FIG. 2 or 2A but it would be annularly in margins 25 and 26). FIG. 2A illustrates the condition of the slit membrane valve when the fluid pressure on rear surface 20b exceeds that on front surface 20a by an amount sufficient to open the valve.

Figure 3:
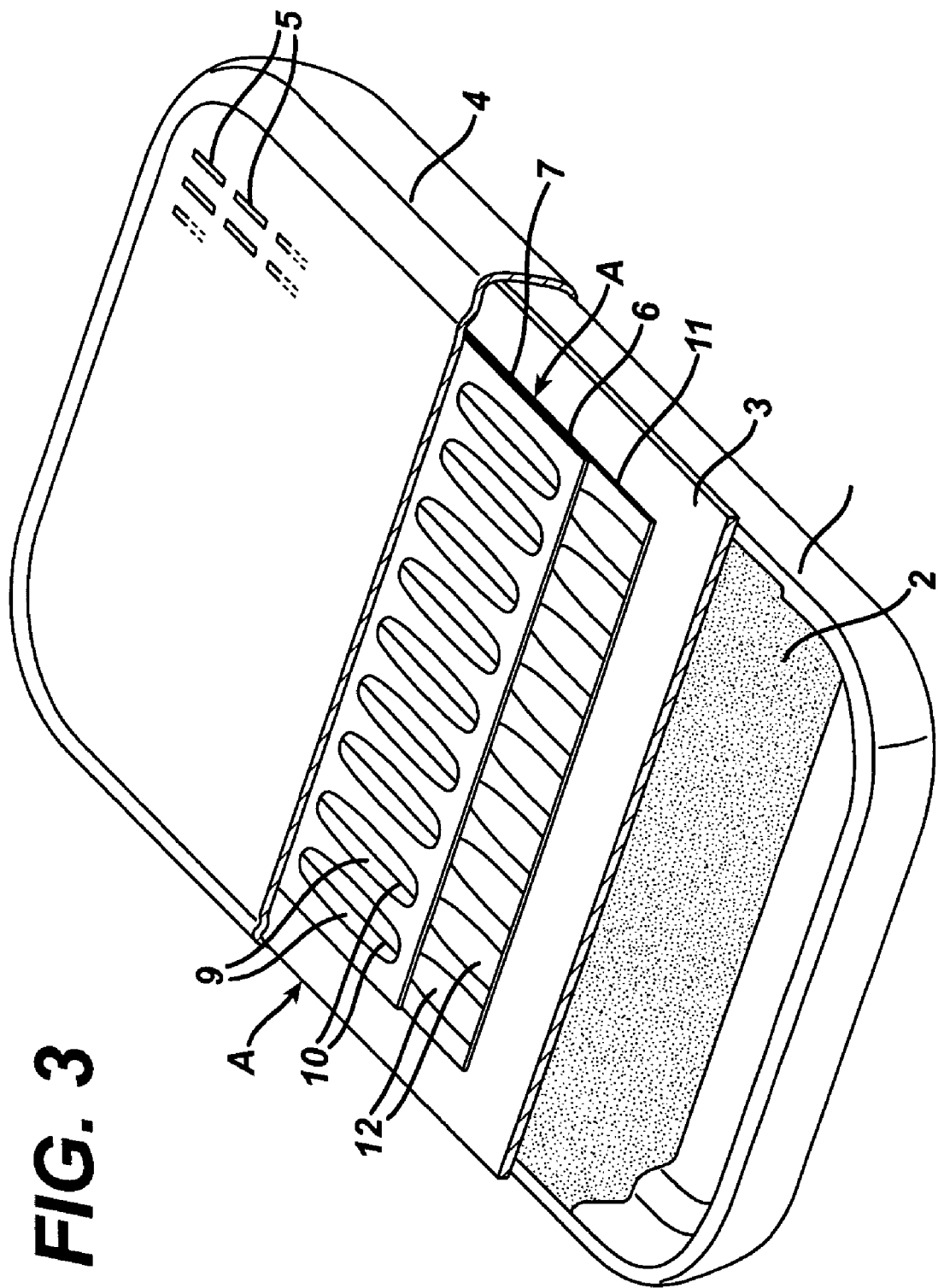
FIG. 3 is a part cut away simplified view of a disposable "telecom battery" of the invention.

FIG. 3 shows a part cut-away simplified view of a "telecom battery" of the invention. The battery is of generally conventional zinc/air battery design. Thus, it comprises a tray member 1 for containing the anode 2 and cathode 3, and a lid 4 for sealing (usually by crimping) to the tray member 1. Lid 4 is of metal and includes a series of slots 5 formed in the metal to admit air to the cell. The dimensions of slots 5 are 7 mm×190 μm.

In accordance with the invention, the cell also contains a stainless steel sheet 6 which is 100 μm thick and has elongate apertures 7 (7 mm×2 mm) formed therein. Adhesively mounted on the underside of sheet 6 is a thin resilient membrane 8. In each region 9 of the membrane which extends across an aperture 7 in sheet 6, there is a linear slit 10 of length 6 mm. The slit membrane is adhesively sealed to sheet 6 and constitutes valves for control of the flow of air into and out of the battery via the slits 10 and lid 4.

Figure 4:
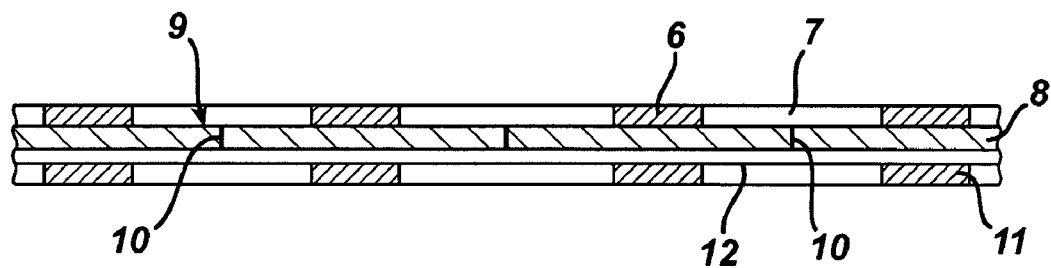
FIG. 4 is an enlarged scale simplified sectional view on the line A-A of a steel plate, membrane and paper sheet.

In order to provide extra stiffening support for the membrane 8, especially in regions 9, an apertured sheet of paper 11 is provided to lie between membrane 8 and cathode 3 in the cell. The paper sheet 11 has apertures 12 therein generally corresponding to those in stainless steel sheet 6 and the paper sheet 11 is positioned with its apertures 12 lying directly below apertures 7 in sheet 6. The arrangement is shown in FIG. 4.

Various standard features of a zinc/air battery such as the anode and cathode current leads etc. have been omitted from FIG. 3 for clarity. Also not shown in FIG. 3 is the preferred feature of a small air passageway which remains always open so as to sustain standby currents. As an alternative to this air passageway, the slit membrane may be arranged to leak sufficient oxygen to sustain the standby currents when in a closed configuration. This may be achieved, for example, by removing membrane material when cutting the slit so that a gap forms in the membrane even when in an undeflected planar condition.

In the manufacture of the zinc/air battery of FIG. 3, lid 4 is pressed from nickel-plated steel sheet and slots 5 are formed therein by laser cutting. A latex membrane 8 is glued to apertured stainless steel sheet 6, and the slits 10 are cut in the membrane (in the apertured areas of sheet 6) using a milling machine. The sheet 6 is then adhered to the underside of lid 4 (with the latex membrane facing into the cell). Apertured paper stiffener 11 is then adhered to the latex membrane, the adhesive being on areas away from the slits, and the apertures in stiffener 11 being in correspondence to the slits 10. The anode 2 and cathode 3 are then assembled and lid 4 bonded (via electrical insulant) to tray member 1 to form the battery.

Figure 5:
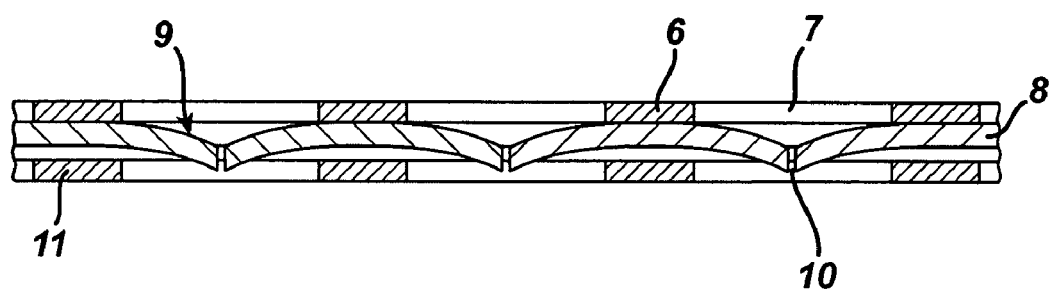
FIG. 5 is a view similar to FIG. 4 but with the membrane slit valves open.

In operation of the battery of FIG. 3, when there is demand for current, oxygen in the cell becomes depleted and the gas pressure in the cell falls below the gas (air) pressure externally of the cell. The unsupported regions 9 of membrane 8 flex downwards under the air pressure, causing each slit 10 to open (FIG. 5) and admit air into the cell. When the pressure difference across the membrane disappears, the membrane returns to its unstressed planar configuration (FIG. 4) in which the slits are closed.

Figure 6:
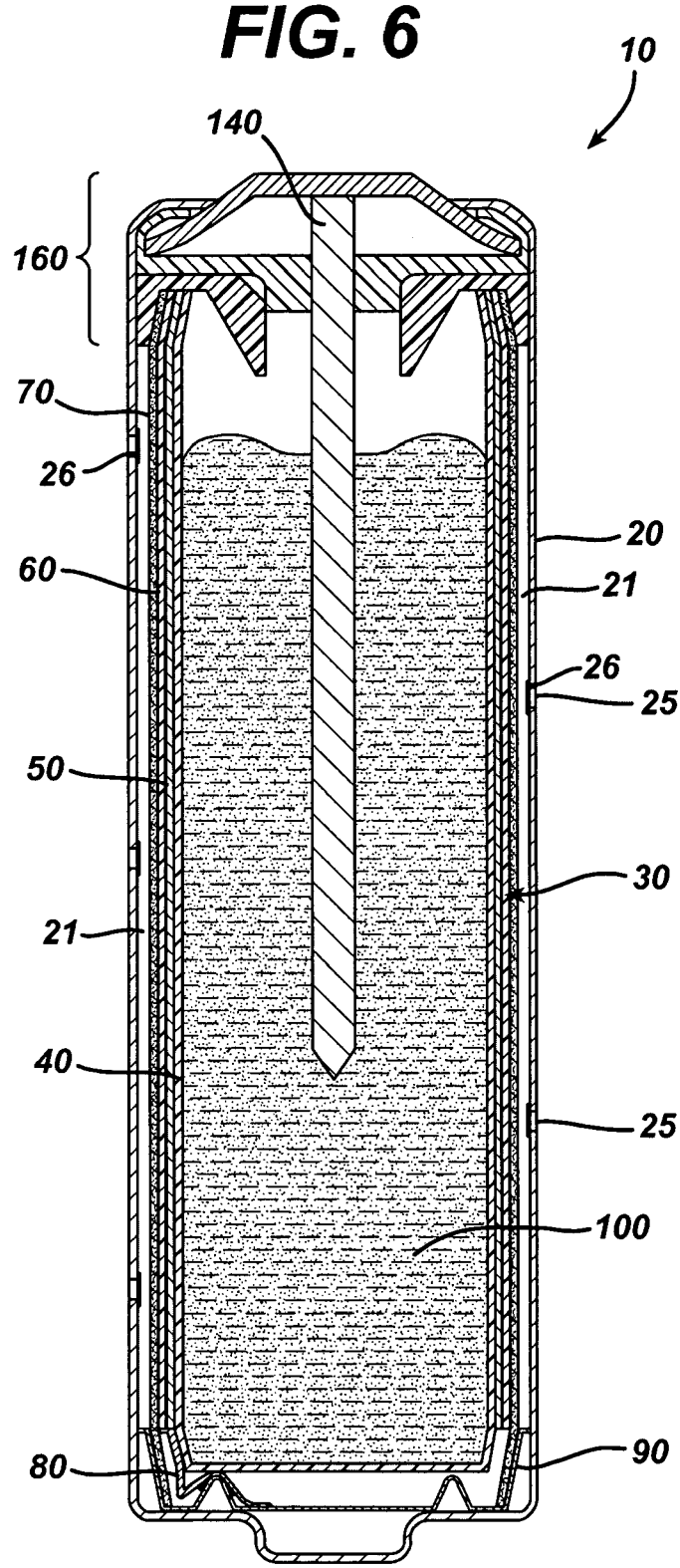
FIG. 6 is an axial sectional view of an embodiment of cylindrical air recovery battery of the invention.

Referring to FIG. 6, a cylindrical air recovery battery 10 includes a can 20 having a wall with at least one air access passageway 25 in the wall of the can 20. The can 20 includes a cathode assembly 30 formed to fit inside the can 20 to define a cavity 21. The cathode assembly 30 includes a separator 40, a cathode 50, a barrier layer 60, and an air diffusion layer 70. The cathode assembly 30 further includes a tab 80 welded to the cathode 50, and a bottom cup 90 placed on an end of the cathode assembly 30 and welded to the tab 80. Disposed inside the cavity of the cathode assembly 30 is an anode 100. Disposed on another end of the cathode assembly 30 is a sealing assembly 160 including a current collector 140. The can 20 is sealed, e.g. by a mechanical crimp, to form the battery 10.

Figure 7:
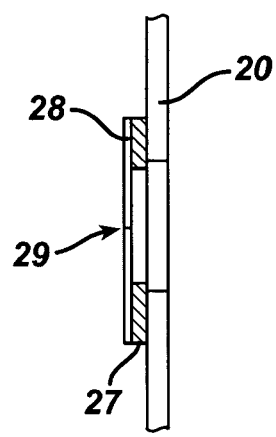
FIG. 7 is an enlarged view of valve 26 in FIG. 6.

Disposed on the inner wall of can 20 in cavity 21, over each air access passageway 25, is an air admission valve 26 which is shown more clearly in FIG. 7. Each valve 26 comprises an apertured support plate 27 which on one side is adhered to can 20 with the aperture in plate 27 coincident with passageway 25 in can 20. To the other side of plate 27 is adhered a thin membrane 28 having a straight slit 29 therein. The valve arrangement is essentially similar to that described above with reference to FIGS. 1C, 2, 2A, 3, 4 and 5.

When the air recovery battery is in use to supply a current, the valve 26 will be closed since the air pressure in the cavity 21 will be the same as the ambient air pressure outside can 20. However, when the battery is not in use, or its rate of discharge becomes low, oxygen in the air in cavity 21 will react with spent (reduced) cathode material to re-oxidise it. As the oxygen is used up, the air pressure in cavity 21 falls so that the ambient air pressure outside the can 20 is greater than the pressure within the cavity 21. The valve then opens as the membrane regions each side of the slit are deflected inwardly of the can. Opening of the valve admits fresh air to cavity 21 until the air pressures in cavity 21 and outside can 20 are more nearly equal, at which point the valve will close. The valve will re-open and re-close automatically any number of times in dependence solely on the pressure difference. Thus, as more oxygen is absorbed in cavity 21 by reaction with the cathode material, so the air pressure drops, the valve opens and more air is admitted.

It will be understood that the ability of the aforementioned membrane valves to open under the relatively low pressure differentials generated in batteries is dependent on mechanical properties of the membrane material. However, the way in which a particular material is used to provide a selectively openable aperture in a valve will also determine the operable range of pressure differentials. For example, if a membrane is used as a flap to cover an air passageway, then the pressure differential required to deflect the flap and open the air passageway will be generally less than that required to deflect the same membrane material arranged with a slit. Thus, in certain applications where the pressure differentials generated by a cell are low, it may be desirable to use membrane material to form a valve flap rather than a valve slit. Indeed, the slits in any of the previously described embodiments may be replaced with flaps.

A flap may be provided in membrane material with an appropriate cut which need not necessarily remove any membrane material. It will be understood that, if a semi-circular cut is made in a membrane material, then a flap will be formed which may be used to cover an air passageway.

Figure 8:
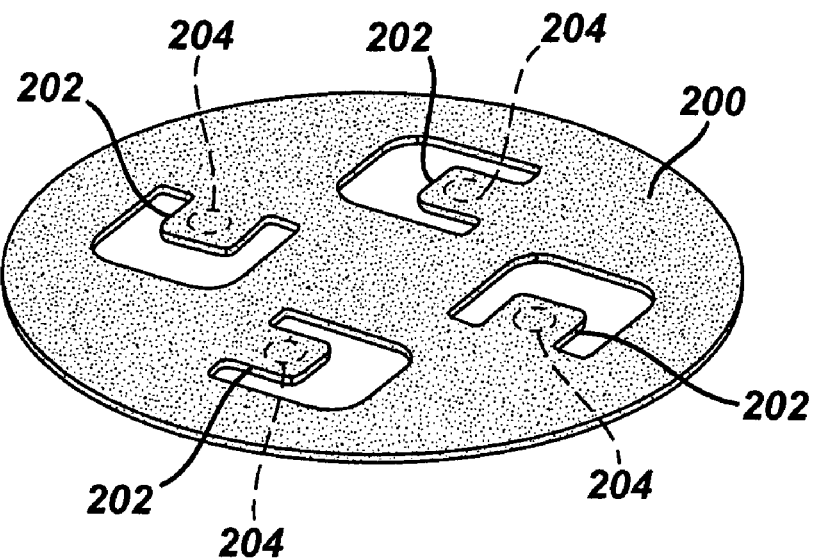
FIG. 8 is a schematic perspective view of a membrane defining four flaps for use in a cell according to the present invention.
Figure 9:
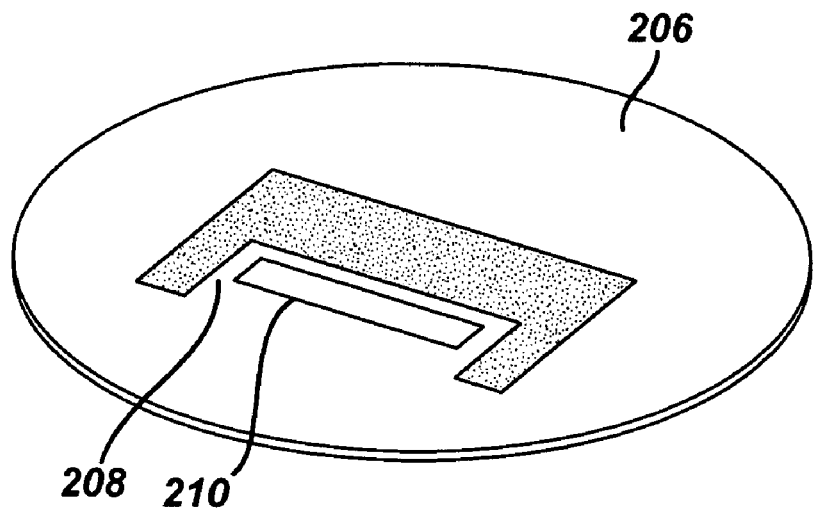
FIG. 9 is a schematic perspective view of a membrane defining a single elongate flap for use in a cell according to the present invention.

Of course, it may be desirable to remove membrane material when forming a flap so that edges of the flap are spaced from the remainder of the membrane. A membrane 200 comprising four such flaps is shown in FIG. 8 of the accompanying drawings. Each flap portion 202 is sized and positioned so as to allow an associated air passageway 204 to be covered (i.e. closed). A particular air passageway may be opened when sufficient differential pressure is applied to deflect the associated flap about its junction with the remainder of the membrane. By way of a yet further example, a membrane 206 is shown in FIG. 9 as comprising a single flap 208 sized and positioned to cover (i.e. close) a single air passageway 210.

Generally speaking, the membranes used in the valves of the present invention will be non-porous and impermeable to water and carbon dioxide. In order to provide this characteristic, a membrane may be metallised. However, in circumstances where a standby current must be sustained, a leakage of oxygen past the valve may be ensured even when the valve is in a closed configuration by selecting a membrane material having a finite porosity. Alternatively, a leakage of oxygen may be ensured by arranging the valve so that a finite opening is provided in the closed configuration.

Other embodiments are within the claims.

What is claimed is:

1. A battery comprising an air cathode that consumes oxygen, a zinc anode, and an air access passageway that is closed by a non-liquid valve actuable by differential pressure to provide an opening therein to admit air to the battery, said valve comprising a thin resilient membrane having a thickness of 10 to 200 µm, comprising a slit having a length of 3 mm to 7 mm, normally closing said passageway but being deformable by differential pressure of no more than 2 mbar to provide said opening in said slit.

2. A battery according to claim 1, wherein said air access passageway is arranged to admit air to an air space in the battery, and wherein said valve is actuable in response to a fall in pressure in said air space relative to air pressure externally of the battery, to open said passageway to admit air to said air space.

3. A battery according to claim 1, wherein said passageway is covered by said membrane.

4. A battery according to claim 1, wherein said membrane is mounted with respect to a casing of the battery, said casing comprising said at least one air access passageway.

5. A battery according to claim 4, wherein said membrane is mounted directly on said casing to close said air access passageway.

6. A battery according to claim 4, wherein said membrane is mounted on a plate member located with respect to said battery casing.

7. A battery according to claim 1, wherein said membrane is elastomeric.

8. A battery according to claim 7, wherein said membrane exhibits zero permanent deformation on recovery from up to 10% deformation.

9. A battery according to claim 1, wherein said membrane is approximately 100 µm thick.

10. A battery according to claim 1, wherein said membrane is of a material having a Young's modulus of not greater than 28 MPa.

11. A battery according to claim 10, wherein said membrane material has a Young's modulus from 1.6 to 1.8 MPa.

12. A battery according to claim 10, wherein said membrane material has a Young's modulus of not greater than 2 kPa.

13. A battery according to claim 12, wherein the membrane material has a Young's modulus of approximately 1.6 kPa.

14. A battery according to claim 1, wherein the membrane is of a material having a resilience of not greater than 50 MPa.

15. A battery according to claim 14, wherein said membrane material has a resilience not greater than 2 MPa.

16. A battery according to claim 15, wherein said membrane material has a resilience of approximately 1.1 MPa.

17. A battery according to claim 1, wherein said membrane has been made by calendaring.

18. A battery according to claim 1, wherein said membrane is of a material having a Young's modulus from 1.6 to 1.8 MPa and a resilience of approximately 1.1 MPa.

19. A battery according to claim 1, wherein said membrane comprises a material selected from the group consisting of natural rubber, neoprene, nitrile rubber, polybutadiene, a copolymer of butadiene, polyisoprene, a butyl rubber, and a silicone elastomer.

20. A battery according to claim 1, wherein said membrane comprises natural rubber or addition-cured vinyl siloxane.

21. A battery according to claim 1, wherein said slit is a cut made in said membrane without removal of membrane material.

22. A battery according to claim 1, wherein said slit is rectilinear.

23. A battery according to claim 1, wherein said slit has a length of 6 mm.

24. A battery according to claim 1, wherein said slit is located centrally in a position of membrane extending unsupported in said access passageway.

25. A battery according to claim 24, wherein said unsupported membrane portion is elliptical in shape.

26. A battery according to claim 24, wherein opposed ends of said slit are each spaced from the edge of said unsupported membrane portion.

27. A battery according to claim 26, wherein said opposed ends are each spaced from the edge of said unsupported membrane portion by a distance of between 0.5 and 1.0 mm.

28. A battery according to claim 1, wherein said differential pressure is no more than 0.5 mbar.

29. A battery according to claim 1, wherein said membrane defines a flap normally closing said passageway.

30. A battery according to claim 1, the battery comprising a cathode accessible to the air admitted to the battery.

31. A battery according to claim 1 which is a mobile telephone battery.

32. A battery according to claim 1, which is an air recovery battery.

33. A battery according to claim 1, wherein the membrane comprises only one slit.

34. A battery according to claim 1, the battery including a casing that includes the air access passageway, wherein the casing includes only one outer opening for air to enter the air access passageway.

35. A battery according to claim 34, wherein the slit is centered relative to the outer opening in the casing.

36. A zinc-air battery comprising;
an anode including zinc;
a cathode that consumes oxygen; and
a separator between the anode and the cathode;
wherein the cathode comprises an outer casing including
an air passageway; a resilient membrane comprising a slit, normally closing the air passageway but being deformable by differential pressure of no more than 2 mbar to provide an opening in said slit to adjust oxygen during use of the battery, the air membrane having a thickness of 10 to 200 μm and the slot having a length of 3 to 7 mm; an air distribution layer interior to the membrane; and a catalyst layer interior to the air distribution layer.

37. A battery according to claim 36, wherein the casing includes only one outer opening for air to enter the air access passageway.

38. A battery according to claim 37, wherein the slit is centered relative to the outer opening in the casing.

* * * * *

UNITED STATES PATENT AND TRADEMARK OFFICE
CERTIFICATE OF CORRECTION

| | |
|---|---|
| PATENT NO. | : 7,378,180 B2 |
| APPLICATION NO. | : 10/655449 |
| DATED | : May 27, 2008 |
| INVENTOR(S) | : Brian Edward Causton et al. |

It is certified that error appears in the above-identified patent and that said Letters Patent is hereby corrected as shown below:

Column 11, line 54:
In claim 7, delete "elastomenc" and insert --elastomeric--

Signed and Sealed this

Nineteenth Day of August, 2008

JON W. DUDAS
*Director of the United States Patent and Trademark Office*